US006845501B2

(12) United States Patent
Thompson et al.

(10) Patent No.: US 6,845,501 B2
(45) Date of Patent: Jan. 18, 2005

(54) METHOD AND APPARATUS FOR ENABLING A COMPILER TO REDUCE CACHE MISSES BY PERFORMING PRE-FETCHES IN THE EVENT OF CONTEXT SWITCH

(75) Inventors: Carol L. Thompson, San Jose, CA (US); Michael L. Zi gler, Campbell, CA (US); Jerome C. Huck, Palo Alto, CA (US); Lawrence D. K. B. Dwyer, South San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 555 days.

(21) Appl. No.: 09/917,535

(22) Filed: Jul. 27, 2001

(65) Prior Publication Data

US 2003/0023663 A1 Jan. 30, 2003

(51) Int. Cl.[7] ................................................. G06F 9/45
(52) U.S. Cl. ...................... 717/140; 717/127; 717/128; 717/141; 717/151; 711/3; 711/113; 711/213; 712/228; 712/229; 712/237; 718/108
(58) Field of Search .......................... 717/140–141, 717/127–128, 151; 711/2, 3, 113, 169, 213, 111, 128, 136, 118; 712/228, 242, 229, 237; 718/108

(56) References Cited

U.S. PATENT DOCUMENTS

| | | | | | |
|---|---|---|---|---|---|
| 3,571,804 A | * | 3/1971 | Hemdal et al. | ............. | 712/242 |
| 5,361,337 A | * | 11/1994 | Okin | ........................ | 712/228 |
| 5,471,602 A | * | 11/1995 | DeLano | ..................... | 711/118 |
| 5,732,242 A | * | 3/1998 | Mowry | ....................... | 711/136 |
| 5,742,804 A | * | 4/1998 | Yeh et al. | ................... | 712/237 |
| 5,761,515 A | * | 6/1998 | Barton et al. | ............... | 717/158 |
| 5,784,711 A | * | 7/1998 | Chi | ............................ | 711/213 |
| 6,047,363 A | * | 4/2000 | Lewchuk | .................... | 711/213 |
| 6,237,073 B1 | * | 5/2001 | Dean et al. | ................. | 711/202 |
| 6,240,488 B1 | * | 5/2001 | Mowry | ...................... | 711/128 |
| 6,282,706 B1 | * | 8/2001 | Chauvel et al. | ............. | 717/150 |
| 6,378,023 B1 | * | 4/2002 | Christie et al. | ............. | 710/260 |
| 6,549,995 B1 | * | 4/2003 | Schulz et al. | ............... | 711/202 |
| 6,578,131 B1 | * | 6/2003 | Larson et al. | ............... | 711/216 |
| 6,651,245 B1 | * | 11/2003 | Damron et al. | ............. | 717/159 |
| 6,732,235 B1 | * | 5/2004 | Krivacek et al. | ........... | 711/118 |

OTHER PUBLICATIONS

Title: Automatic Compiler Techniques for Thread Coarsening for Multithreaded Architectures, author:Zoppetti et al, ACM, 2000.*
Title: The Performing Implications of Thread Management Alternatives for Shared–Memory Multiprocessors, author: Anderson et al, ACM, 1989.*
Title: Instruction Prefetching of Systems Codes with layout optimized for reduced cache misses, author: Xia et al, 1996, ACM.*
Title: The effect of context switches on cache performance, Mogul et al, ACM, 1991.*
Title: Reducing Multithreaded frame cache miss ratio by prefetching and working frame set scheduling, author: Choi et al, IEEE, 1996.*

* cited by examiner

*Primary Examiner*—Chameli Das

(57) ABSTRACT

A method for reducing cache memory misses in a computer that performs context switches between at least a first context and a second context. A First logic identifies a first prefetch region in a first memory element and a second logic identifies critical memory references within the first prefetch region during compilation of a computer program. The critical memory references within the first prefetch region correspond to data in cache memory if a context switch occurs from a process or thread associated with the second context to a process or thread associated with the first context during program execution. Third logic prefetches data associated with the identified critical memory references and stores the prefetched data in cache memory prior to a process or thread associated with the first context being resumed when a switch from the second context to the first context occurs during program execution.

20 Claims, 3 Drawing Sheets

METHOD AND APPARATUS FOR ENABLING A COMPILER TO REDUCE CACHE MISSES BY PERFORMING PRE-FETCHES IN THE EVENT OF CONTEXT SWITCH

TECHNICAL FIELD OF THE INVENTION

The present invention relates to compilers and, more particularly, to a compiler that generates pre-fetches that are performed in the event of context switch wherein the compiler returns from the context switch within a specified code region in cache memory to reduce cache misses.

BACKGROUND OF THE INVENTION

In a computer system that is multi-threaded or multi-programmed, and that utilizes cache memory, upon each context switch made by the operating system, one thread or process is swapped out of cache and another is swapped into cache. When this occurs, the cache is generally re-populated only as the new thread or process references its data. Thus, after such a context switch, the new thread or process generally incurs a high frequency of cache misses.

Furthermore, in a computer system that supports multiple outstanding cache misses, but which stalls on the first use of data being loaded, re-populating cache only as a new thread or process references its data may result in ineffectual use of all available bandwidth.

SUMMARY OF THE INVENTION

Accordingly, a need exists for a method and apparatus that enable the number of cache misses that typically occur in the event a context switch to be reduced or eliminated, thus enabling the bandwidth of the computer system to be efficiently utilized. The apparatus of the present invention comprises at least first logic, second logic and third logic that perform certain functions that enable cache misses to be reduced or eliminated. The first logic identifies at least a first prefetch region in a first memory element during compilation of a computer program by the computer. The second logic identifies critical memory references within the first prefetch region during compilation. The critical memory references within the first prefetch region correspond to data that may be needed in cache memory if a context switch occurs from a process or thread associated with the second context to a process or thread associated with the first context during program execution by the computer. The third logic prefetches data associated with the identified critical memory references and stores the prefetched data in cache memory prior to a process or thread associated with the first context being resumed when a switch from the second context to the first context occurs during program execution.

The method of the present invention at least comprises the steps of: identifying at least a first prefetch region in a first memory element during compilation of a computer program by the computer; identifying critical memory references within the first prefetch region during the compilation, the critical memory references within the first prefetch region corresponding to data that may be needed in cache memory if a context switch occurs from a process or thread associated with the second context to a process or thread associated with the first context during program execution by the computer; and, during program execution, prefetching data associated with the identified critical memory references and storing the prefetched data in cache memory prior to the process or thread associated with the first context being resumed when a switch from the second context to the first context occurs.

These and other features and advantages of the present invention will become apparent from the following description, drawings and claims.

DETAILED DESCRIPTION OF THE INVENTION

Figure 1:
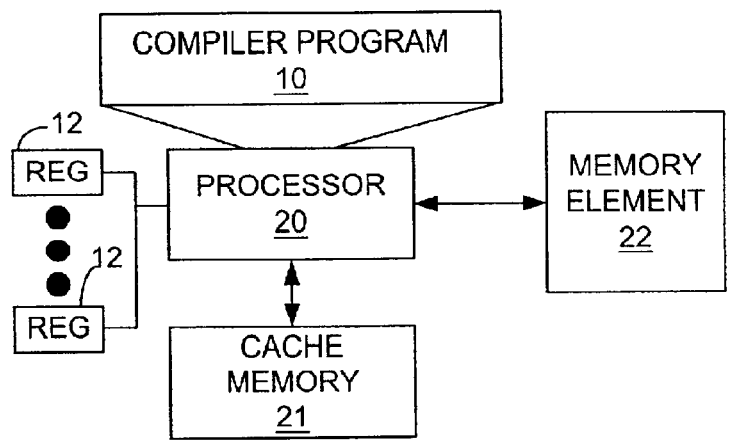
FIG. 1 is a block diagram of the apparatus of the present invention.

The method and apparatus of the present invention enable the number of cache misses that often occur when a context switch occurs to be reduced, thus enabling the bandwidth of the computer system to be efficiently utilized. The apparatus of the present invention is illustrated in block diagram form in FIG. 1. The apparatus preferably comprises a processor 20 configured to execute a compiler program 10, a memory element 22 for storing data and instructions, a cache memory element 21 for performing cache memory functions, and a set of architected registers 12, which are used for various reasons, as discussed below with respect to the various embodiments of the present invention. The number of registers used is not limited to any particular number, as will become apparent from the following discussion. The processor 20, the cache memory 21 and the registers 12 may be comprised in a single integrated circuit (IC), as is normally the case. In this case, the memory element 22 may be internal or external to the IC. However, as will be understood by those skilled in the art, some or all of these components may be discrete components configured to be in communication with one another.

In accordance with the present invention, rather than waiting until after a process or thread has resumed from a context switch to re-populate the cache memory 21, as with prior known computer systems and compilers, a set of prefetches associated with a non-executing thread or process are determined and performed prior to resuming from a context switch so that, in the event of a context switch back to the non-executing thread or process, cache memory 21 will be pre-populated. This concept may be implemented in a number of ways, some of which are described below with respect to the example embodiments of FIGS. 2A–3B.

Possible prefetch regions include, for example, loops that iterate over an array, regions over which a particular pointer is de-referenced multiple times, and entire procedures. Critical memory references include, for example, array references within a loop. An actual prefetch may be comprised of n cache lines beyond the "current" element at the time of the context restore, depending on the expected latency per iteration of the loop and the expected prefetch latency (this is only possible if the prefetches are generated as actual code; otherwise, the method and apparatus would require a more complex interface, which is less desirable). Pointers that are being actively de-referenced during the region are another example of a critical memory reference. An actual prefetch may be comprised of n cache lines beyond the pointer, depending upon the size of the data object being referenced. Another example of a critical memory reference is global (scalar) variables that are referenced multiple times during a procedure.

Figure 2A:
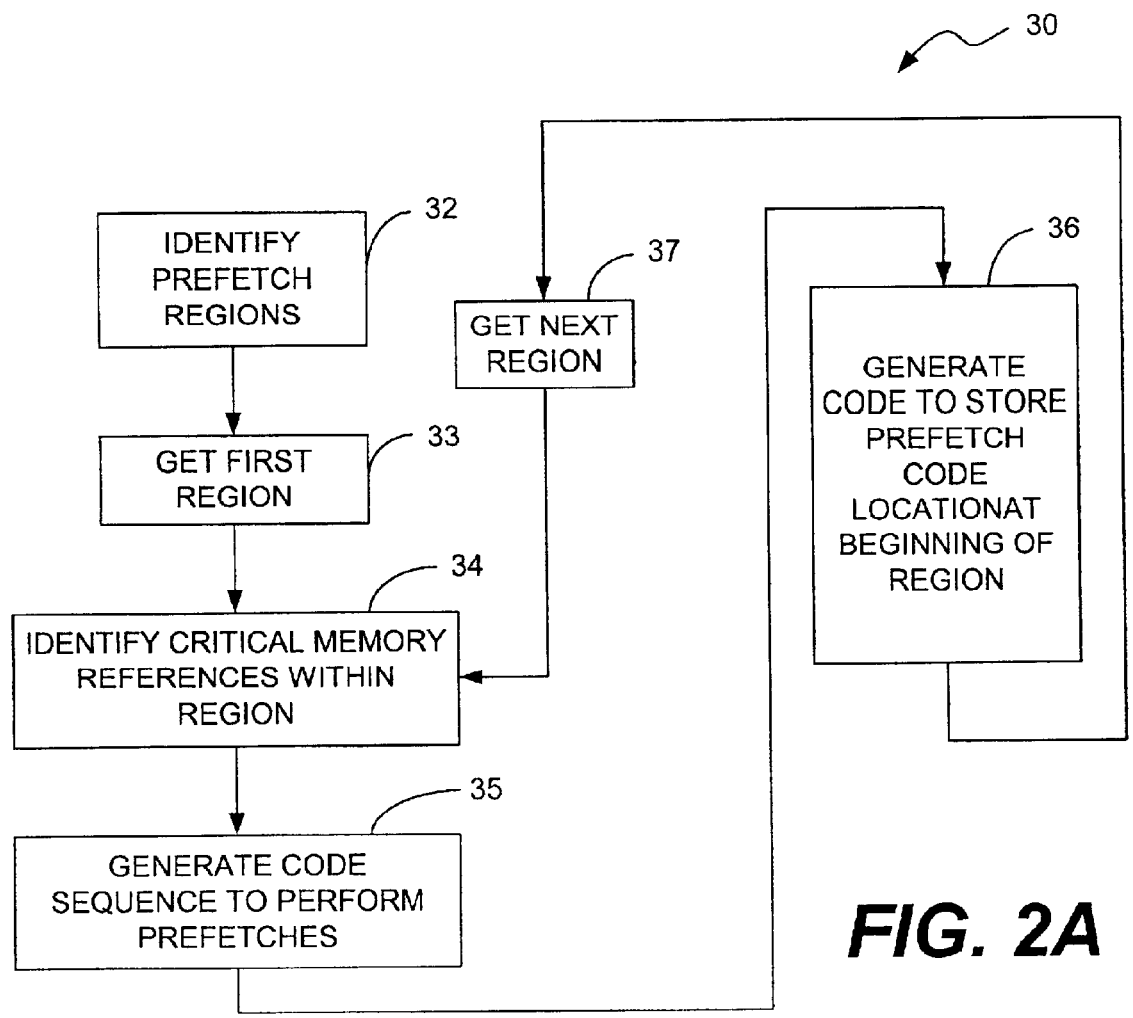
FIG. 2A is a flow chart illustrating the method of the present invention in accordance with one embodiment.

FIG. 2A illustrates a first embodiment of the method 30 of the present invention. As the processor 20 running the compiler is executing in a first context (i.e., executing in a particular thread or process), the processor 20/compiler program 10 observes what regions in memory element 22 contain references to data that is ideally located in cache memory 21. From this observation, the processor 20 identifies prefetch regions, i.e., candidate regions that are actively referencing data that must be present in the cache in order to achieve optimal performance. This functionality is represented by block 32 in FIG. 2A. Once these prefetch regions have been identified, a first one of the prefetch regions is selected, as indicated by block 33. Within the selected prefetch region, the processor 20/compiler 10 determines the critical memory references within the particular region, i.e., particular addresses within the selected region that are desirably located in cache memory 21, as indicated by block 34. The processor 20/compiler 10 then generates code for prefetching the data corresponding to the critical memory references, as indicated by block 35. For each region identified as a prefetch region, the process described above with reference to blocks 34 and 35 is performed, as indicated by block 37.

In addition to generating the code that performs the prefetches, code is generated that stores a prefetch code address location (hereinafter referred to as "PCA") at the beginning of the code region associated with a particular process or thread, as indicated by block 36. However, this code that stores the location of the prefetch code is not executed until runtime. The saving of the return location is done by the processor or operating system (OS) at the time the context is originally switched from this process or thread to another (this is standard industry practice). Upon resumption, the operating system has access to this return location, and will transfer control to that location after executing the prefetch code. It would also be possible for the OS to put this return address into a known register, and then the prefetch code could automatically return through that register.

At execution time, when a context switch occurs from some other context to the selected prefetch region, the prefetch code generated at the step represented by block 35 is executed and the data locations referenced by the critical memory references are loaded into cache memory 21. Thus, populating the cache memory 21 is an antecedent step to resuming the process executing within the prefetch region. The prefetch code is generated at compile time, not at execution time. Only its location must be stored at runtime, so that the OS knows where to find it. There is only a single prefetch region at any one time. That is the region of code to which the process or thread will resume.

Figure 2B:
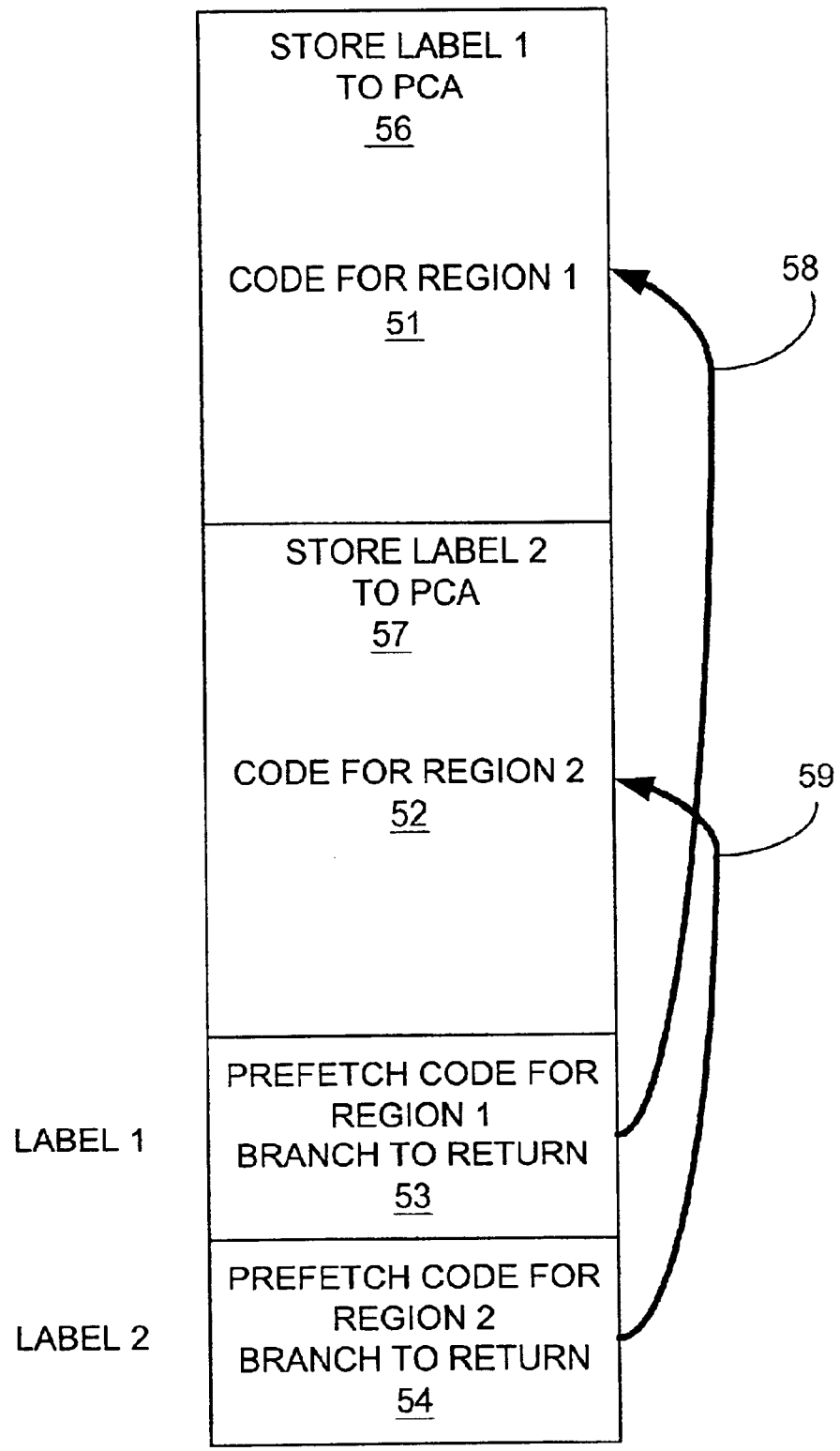
FIG. 2B is a block diagram of a memory device demonstrating the manner in which the compiler shown in FIG. 1 performs the method demonstrated by the flow chart of FIG. 2A.

This method of FIG. 2A is further demonstrated by the block diagram of FIG. 2B. First and second code regions 51 and 52, respectively, are code regions contained in memory element 22. At the beginning of the code regions 51 and 52, in memory element 22, the PCAs 56 and 57, respectively, are stored. Prefetch code 53 and 54 associated, respectively, with PCAs 56 and 57, are also stored in memory, either in registers 12 or in memory element 22. The register or memory location is fixed, so that at execution time, it always contains the PCA associated with the currently executing prefetch region. The PCAs 56 and 57 and their associated prefetch code 53 and 54 are stored by the code generated at the steps represented by blocks 35 and 36 in FIG. 2A. These storing steps are performed prior to resuming the processes corresponding to the respective code regions 51 and 52. For example, the PCA 56 associated with the first code region will be stored before a context switch back to the first code region 51 occurs. Identically, the PCA 57 associated with the second code region will be stored before a context switch back to the second code region 52 occurs. Otherwise, it would not be possible to populate the cache memory before next thread or process begins executing, which is the primary goal of the present invention.

If the PCA of a code region is a valid (i.e., non-null) address, then at the time that the thread or process associated with the code region is resumed, the OS will branch to the location of the associated prefetch code, saving the return address for the code region, preferably in one of the registers 12. Then, when the associated prefetch code has finished executing, the OS will return to the return address contained at the location (e.g., register) at which it was stored. For example, if the PCA 57 for the second code region 52 is a valid (i.e., non-null) address, then at the time that the thread or process associated with the second code region 52 is resumed, the OS will branch to the location of the associated prefetch code 54, leaving the return address for the second code region 52 in one of the registers 12. When the prefetch code 54 has finished executing, the OS will return to the return address contained in the register in which it was stored, which is the point at which execution of the process or thread associated with the second code region should resume, i.e., the location in the code at which the process was originally interrupted before it was "swapped out", i.e., before the context switch from the process or thread associated with the second code region occurred. This return to the location in the second code region is indicated by arrow 59.

Figures 3A, 3B:
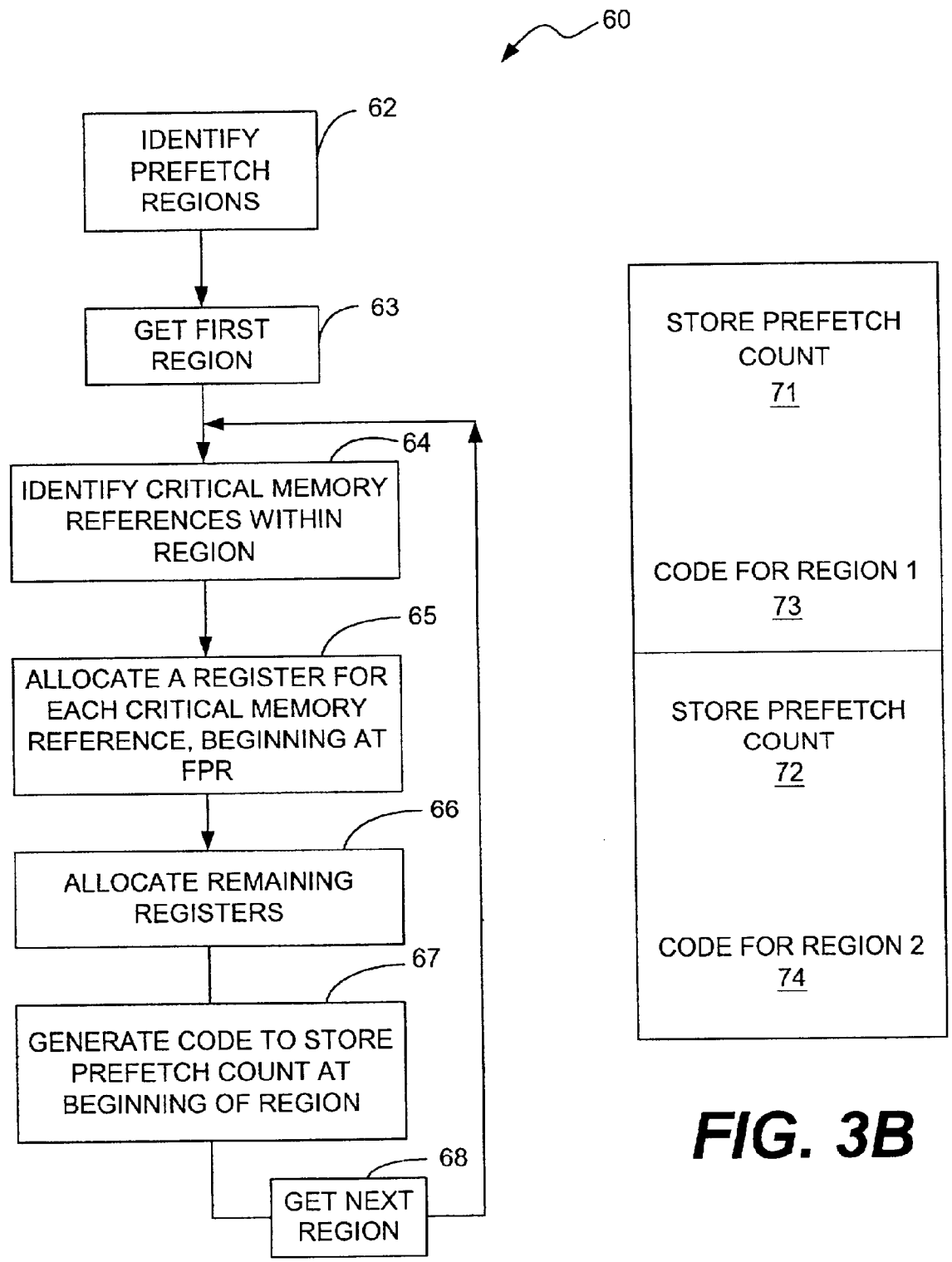
FIG. 3A is a flow chart illustrating the method of the present invention in accordance with another embodiment.
FIG. 3B is a block diagram of a memory device demonstrating the manner in which the compiler shown in FIG. 1 performs the method demonstrated by the flow chart of FIG. 3A.

FIGS. 3A and 3B will be used to describe another embodiment of the present invention in which the addresses of the code to be prefetched are stored in a fixed number of registers, n, such as registers 12 shown in FIG. 1. The number of prefetches that need to be performed, or the prefetch count, is stored in memory element 22 at the beginning of the code for the region. Prior to describing the manner in which the prefetches occur, the manner in which the number of registers needed is determined, the manner in which registers are allocated, and the manner in which the prefetch counts are determined and stored will be described with reference to FIG. 3A.

As shown in FIG. 3A, the first step in the method 60 in accordance with this embodiment is to identify the prefetch regions, as indicated by block 62. Steps 62 through 64 in FIG. 3A are the same as steps 32 through 34 in FIG. 2A. The processor 20/compiler 10 then allocates a register 12 for each critical memory reference beginning at a First Prefetch Register (FPR), which, in accordance with this embodiment, is always a particular, or constant, starting register. This step is represented by block 65. The remainder of the registers are then consecutively allocated with reference to their associated FPR, as indicated by block 66. Each of the allocated registers contains an address of data located in memory element 22 that is to be prefetched for loading into cache memory 21.

The code needed to store the prefetch count at the beginning of the selected region is generated at the step represented by block 67. As stated above, the prefetch count for a particular region is stored at the beginning of the region with which it is associated in memory element 22, as shown in block 3B. The prefetch count corresponds to the number of the registers allocated for a particular identified prefetch region. The method 60 then proceeds to the next identified prefetch region, as indicated by block 68. The process then continues in the manner discussed above with reference to blocks 64–67.

Before resuming a thread or process, the OS obtains the stored prefetch count for the current prefetch region (i.e., the code region to which the thread or process will resume) by loading it from the prefetch count location, and then executes the prefetches contained in the consecutive registers, beginning with the FPR and continuing until the prefetch corresponding to the last consecutive register has been performed. As the OS prefetches the data from memory element 22, it loads it into cache memory 21 so that the data is ready to be referenced efficiently from cache memory 21 when the thread or process resumes. There is only one single prefetch region at any one time. That is the region of code to which the process or thread will resume. Similarly, there is only one FPR, which is always the same.

It should be noted that, because it is generally not possible to issue loads from indirect register locations, it would probably be most efficient for the OS to have a code sequence which issues the maximum number, m, of prefetches, beginning with the register number FPR+m−1, and continue down the register file to register number FPR. The OS can use the prefetch count to do a vectored branch into the string of prefetches at the appropriate location. If the addresses of interest are not all available at the beginning of the prefetch region, the compiler should null out the register (set it to zero), to avoid generating spurious prefetches. Then, either the processor can ignore null prefetches, or the prefetch code can check for null before issuing the prefetch.

It should be noted that although the present invention has been described with reference to certain embodiments, it is not limited to these particular embodiments. Those skilled in the art will understand that variations and modifications can be made to the embodiments described herein that are within the spirit and scope of the present invention. For example, the configuration of the apparatus of the present invention shown in FIG. 1 can be implemented in a variety of ways with a variety of architectures. Also, the memory element 22 is not limited to any particular type of memory element and any suitable computer-readable medium can be used for this purpose. Similarly, the processor 20 is not limited to any particular type of processor, except that it must be capable of performing the aforementioned functions. The compiler program 10 can be written in any suitable language and the functions of the compiler discussed above can be implemented with existing compiler program or as a new compiler program.

What is claimed is:

1. An apparatus for reducing cache memory misses in a computer that performs context switches between at least a first context and a second context, the apparatus comprising:

a first logic, the first logic being configured to identify at least a first prefetch region in a first memory element during compilation of a computer program by the computer;

a second logic, the second logic being configured to identify critical memory references within the first prefetch region during compilation, the critical memory references within the first prefetch region corresponding to data that may be needed in cache memory if a context switch occurs from a process or thread associated with the second context to a process or thread associated with the first context during program execution by the computer; and a third logic, the third logic being configured to prefetch data associated with the identified critical memory references and to store the prefetched data in cache memory prior to a process or thread associated with the first context is resumed when a switch from the second context to the first context occurs during program execution.

2. The apparatus of claim 1, wherein the third logic comprises logic configured to generate prefetch code during said compilation, the prefetch code being used by the third logic to prefetch the data associated with the identified critical memory references.

3. The apparatus of claim 1, wherein the third logic comprises logic configured to generate prefetch code and to store the prefetch code at a particular location in a memory element during compilation of a computer program.

4. The apparatus of claim 3, wherein the third logic comprises logic configured to store a location of the prefetch code, the third logic storing the location of the prefetch code during program execution, and wherein, prior to resuming execution of the process or thread associated with the first context, an operating system of the computer determines the location at which the prefetch code is stored and executes the prefetch code thereby obtaining the data to be prefetched and storing the prefetched data in cache memory.

5. The apparatus of claim 1, wherein the third logic comprises logic configured to generate code to store a prefetch count at a particular location in a memory element, the prefetch count corresponding to a number of registers needed for storing addresses at which data corresponding to the critical memory references is stored in a memory element.

6. The apparatus of claim 5, wherein the third logic comprises logic configured to allocate a prefetch memory register to each critical memory reference, and wherein a first one of the prefetch memory registers is a constant starting register.

7. The apparatus of claim 6, wherein, after a context switch from a process or thread associated with the first context to a process or thread associated with the second context has occurred, and prior to resumption of the process or thread associated with the first context has occurred, an operating system of the computer obtains the prefetch count and obtains the data stored at the addresses comprised in the prefetch memory registers beginning with the constant starting register and continuing sequentially through a number of the allocated prefetch memory registers dictated by the prefetch count.

8. A method for reducing cache memory misses in a computer that performs context switches between at least a first context and a second context, the method comprising the steps of:

identifying at least a first prefetch region in a first memory element during compilation of a computer program by the computer;

identifying critical memory references within the first prefetch region during the compilation, the critical memory references within the first prefetch region corresponding to data that may be needed in cache memory if a context switch occurs from a process or thread associated with the second context to a process or thread associated with the first context during program execution by the computer; and during program execution, prefetching data associated with the identified critical memory references and storing the prefetched data in cache memory prior to the process or thread associated with the first context being resumed when a switch from the second context to the first context occurs.

9. The method of claim 8, further comprising the step of:

prior to prefetching the data, generating prefetch code during said compilation, the prefetch code being used during program execution to prefetch the data associated with the identified critical memory references.

10. The method of claim 8, further comprising the step of:

prior to prefetching the data, generating prefetch code during said compilation, the prefetch code being used during program execution to prefetch the data associated with the identified critical memory references; and after generating the prefetch code, storing the prefetch code at a particular location in a memory element during compilation of a computer program.

11. The method of claim 10, further comprising the step of:

after generating the prefetch code, storing a location of the prefetch code in a memory element during program execution; and prior to resuming execution of the process or thread associated with the first context, determining the location at which the prefetch code is stored and executing the prefetch code, thereby obtaining the data to be prefetched and storing the prefetched data in cache memory.

12. The method of claim 8, further comprising the step of:

prior to prefetching the data, generating code to store a prefetch count at a particular location in a memory element, the prefetch count corresponding to a number of registers needed for storing addresses at which data corresponding to the critical memory references is stored in a memory element.

13. The method of claim 12, further comprising the steps of:

allocating a prefetch memory register to each critical memory reference, and wherein a first one of the prefetch memory registers is a constant starting register.

14. The method of claim 12, further comprising the steps of:

after a context switch from a process or thread associated with the first context to a process or thread associated with the second context has occurred, and prior to resumption of the process or thread associated with the first context has occurred, obtaining the prefetch count and obtaining the data stored at the addresses comprised in the prefetch memory registers beginning with the constant starting register and continuing sequentially through a number of the allocated prefetch memory registers dictated by the prefetch count.

15. A computer program for reducing cache memory misses in a computer that performs context switches between at least a first context and a second context, the computer program being embodied on a computer readable medium, the computer program comprising:

a first code segment for identifying at least a first prefetch region in a first memory element during compilation of a computer program by the computer;

a second code segment for identifying critical memory references within the first prefetch region during the compilation, the critical memory references within the first prefetch region corresponding to data that may be needed in cache memory if a context switch occurs from a process or thread associated with the second context to a process or thread associated with the first context during program execution by the computer; and a third code segment for prefetching data associated with the identified critical memory references and storing the prefetched data in cache memory prior to the process or thread associated with the first context being resumed when a switch from the second context to the first context occurs.

16. The computer program of claim 15, further comprising:

a fourth code segment for generating prefetch code during said compilation, the prefetch code being used during program execution by the third code segment to prefetch the data associated with the identified critical memory references.

17. The computer program of claim 15, wherein the third code segment further comprises:

a code segment for generating prefetch code during said compilation, the prefetch code being used during program execution by the third code segment to prefetch the data associated with the identified critical memory references and to store the prefetch code at a particular location in a memory element during compilation of a computer program.

18. The computer program of claim 17, wherein the third code segment further comprises:

a code segment for storing a location of the prefetch code in a memory element during program execution; and a code segment for determining the location at which the prefetch code is stored and executing the prefetch code, thereby obtaining the data to be prefetched and storing the prefetched data in cache memory.

19. The computer program of claim 15, wherein the third code segment further comprises:

a code segment for generating code to store a prefetch count at a particular location in a memory element, the prefetch count corresponding to a number of registers needed for storing addresses at which data corresponding to the critical memory references is stored in a memory element.

20. The computer program of claim 19, wherein the third code segment further comprises:

a code segment for allocating a prefetch memory register to each critical memory reference, and wherein a first one of the prefetch memory registers is a constant starting register; and a code segment for obtaining the prefetch count and obtaining the data stored at the addresses comprised in the prefetch memory registers beginning with the constant starting register and continuing sequentially through a number of the allocated prefetch memory registers dictated by the prefetch count.

* * * * *

UNITED STATES PATENT AND TRADEMARK OFFICE
CERTIFICATE OF CORRECTION

PATENT NO. : 6,845,501 B2
DATED : January 18, 2005
INVENTOR(S) : Carol L. Thompson et al.

Page 1 of 1

It is certified that error appears in the above-identified patent and that said Letters Patent is hereby corrected as shown below:

<u>Title page,</u>
Item [75], should read:
-- [75]   Inventors:   Carl L. Thompson, San Jose, CA
(US); Michael L. Ziegler, Campbell,
CA (US); Jerome C. Huck, Palo Alto,
CA (US); Lawrence D. K. B. Dwyer,
South San Francisco, CA (US) --

Signed and Sealed this

Thirty-first Day of May, 2005

JON W. DUDAS
*Director of the United States Patent and Trademark Office*